United States Patent
Zhang

(10) Patent No.: US 11,931,953 B2
(45) Date of Patent: Mar. 19, 2024

(54) APPARATUS AND METHOD FOR THREE-DIMENSIONAL PRINTING

(71) Applicant: SprintRay Inc., Los Angeles, CA (US)

(72) Inventor: Jing Zhang, Los Angeles, CA (US)

(73) Assignee: SprintRay Inc.

( * ) Notice: Subject to any disclaimer, the term of this patent is extended or adjusted under 35 U.S.C. 154(b) by 0 days.

(21) Appl. No.: 17/497,925

(22) Filed: Oct. 9, 2021

(65) Prior Publication Data

US 2022/0024117 A1    Jan. 27, 2022

Related U.S. Application Data

(63) Continuation of application No. 16/858,215, filed on Apr. 24, 2020, now Pat. No. 11,155,028.

(51) Int. Cl.
| | |
|---|---|
| *B29C 64/124* | (2017.01) |
| *B29C 64/188* | (2017.01) |
| *B29C 64/205* | (2017.01) |
| *B29C 64/241* | (2017.01) |
| *B29C 64/245* | (2017.01) |
| *B29C 64/255* | (2017.01) |
| *B29C 64/264* | (2017.01) |
| *B29C 64/393* | (2017.01) |
| *B33Y 10/00* | (2015.01) |
| *B33Y 30/00* | (2015.01) |
| *B33Y 40/20* | (2020.01) |
| *B33Y 50/02* | (2015.01) |

(52) U.S. Cl.
CPC .......... *B29C 64/124* (2017.08); *B29C 64/188* (2017.08); *B29C 64/205* (2017.08); *B29C 64/241* (2017.08); *B29C 64/245* (2017.08); *B29C 64/255* (2017.08); *B29C 64/264* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
None
See application file for complete search history.

(56) References Cited

U.S. PATENT DOCUMENTS

| | | | | |
|---|---|---|---|---|
| 5,626,919 | A * | 5/1997 | Chapman | B33Y 40/00 427/512 |
| 5,780,070 | A * | 7/1998 | Yamazawa | B29C 64/135 264/401 |
| 8,142,179 | B2 * | 3/2012 | Kihara | B29C 64/135 425/375 |
| 10,821,669 | B2 * | 11/2020 | Thompson | B29C 64/35 |

(Continued)

*Primary Examiner* — Emmanuel S Luk
(74) *Attorney, Agent, or Firm* — Jafari Law Group, Inc.

(57) ABSTRACT

The invention is an apparatus and method for printing 3D objects using a high-viscosity photosensitive material. A 3D printer may include a fluid retaining assembly which comprises a rotating tank. A printing platform is situated in a manner such that a bottom surface of the printing platform makes contact with the printing solution in the tank. To facilitate printing using the high-viscosity printing material, a scraper assembly may be implemented in order to properly prepare the printing solution onto a surface of the tank. The scraper assembly prepares the material by scraping a layer of the material onto the surface of the tank for facilitating curing of the layer onto the printing platform.

24 Claims, 10 Drawing Sheets

(56) References Cited

U.S. PATENT DOCUMENTS

| | | | |
|---|---|---|---|
| 10,953,597 B2* | 3/2021 | Lebrun | B29C 64/165 |
| 2009/0020901 A1* | 1/2009 | Schillen | B29C 70/88 |
| | | | 425/149 |
| 2015/0064298 A1* | 3/2015 | Syao | B29C 64/124 |
| | | | 425/169 |
| 2015/0231831 A1* | 8/2015 | El-Siblani | B29C 64/135 |
| | | | 425/150 |
| 2015/0298396 A1* | 10/2015 | Chen | B29C 64/255 |
| | | | 425/110 |
| 2016/0046071 A1* | 2/2016 | Kuhnlein | B29C 64/40 |
| | | | 425/174.4 |
| 2016/0059494 A1* | 3/2016 | Kobayashi | B29C 64/135 |
| | | | 425/135 |
| 2016/0303795 A1* | 10/2016 | Liu | B29C 64/364 |
| 2016/0325498 A1* | 11/2016 | Gelbart | B29C 64/106 |
| 2016/0368210 A1* | 12/2016 | Chen | B29C 64/124 |
| 2017/0080641 A1* | 3/2017 | El-Siblani | B33Y 30/00 |
| 2017/0129167 A1* | 5/2017 | Castanon | B29C 64/245 |
| 2018/0194080 A1* | 7/2018 | El-Siblani | B33Y 50/02 |
| 2018/0297285 A1* | 10/2018 | Sheppard | B29C 64/245 |
| 2019/0270243 A1* | 9/2019 | El-Siblani | B33Y 70/00 |
| 2019/0291340 A1* | 9/2019 | Medalsy | B29C 64/264 |
| 2020/0070408 A1* | 3/2020 | Elsey | B29C 64/245 |
| 2020/0198231 A1* | 6/2020 | Dubelman | B29C 64/35 |
| 2020/0215415 A1* | 7/2020 | Bologna | G06T 19/20 |
| 2020/0282646 A1* | 9/2020 | Zhang | B29C 64/129 |
| 2020/0353684 A1* | 11/2020 | Dudley | B29C 64/124 |
| 2021/0197464 A1* | 7/2021 | Tseng | B29C 64/255 |
| 2022/0088868 A1* | 3/2022 | Duoss | B29C 64/393 |
| 2022/0134658 A1* | 5/2022 | Schmidt | B29C 64/386 |
| | | | 425/169 |
| 2022/0152915 A1* | 5/2022 | Hasenzahl | B29C 64/30 |

* cited by examiner

FIG. 5
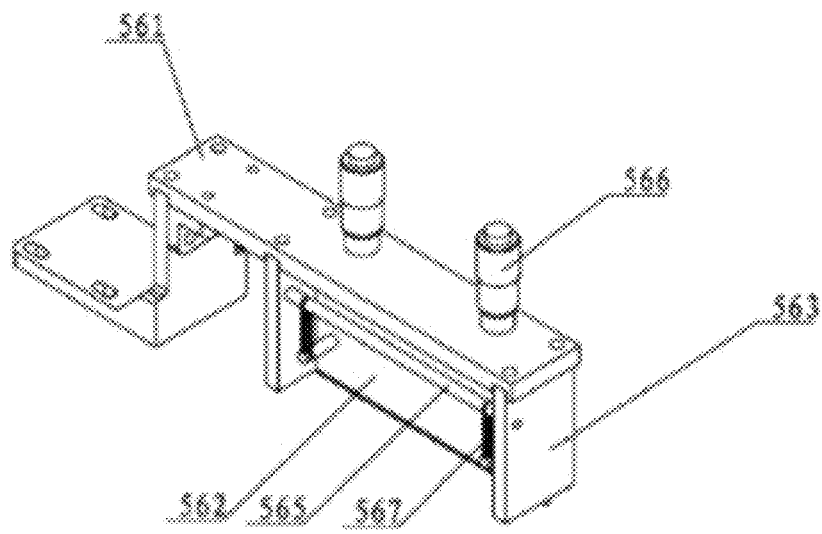
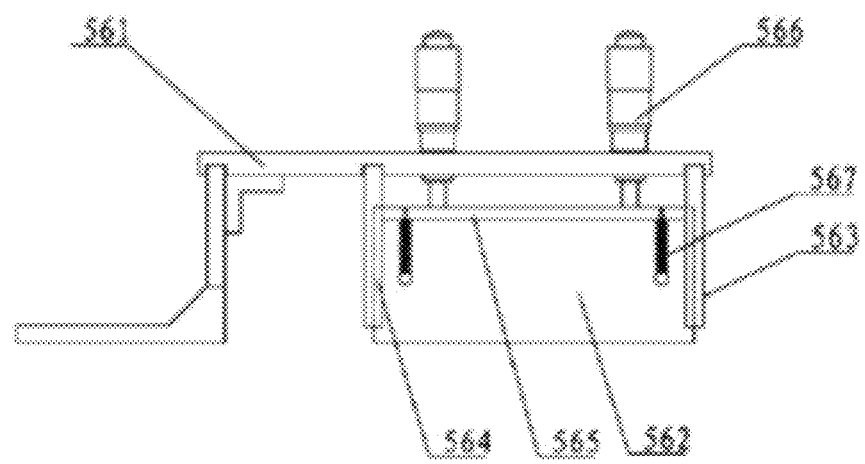
FIG. 6

APPARATUS AND METHOD FOR THREE-DIMENSIONAL PRINTING

PRIOR RELATED APPLICATIONS

This application is a continuation of U.S. nonprovisional application Ser. No. 16/858,215, filed on Apr. 24, 2020, which claims priority to U.S. Provisional Application No. 62/808,295, filed on Feb. 21, 2019, the disclosure of which are incorporated by reference in their entirety.

TECHNICAL FIELD OF THE INVENTION

The present invention relates to a printer, and more particularly to a three-dimensional printer that may be adapted to utilize a high-viscosity photosensitive material.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A three-dimensional printer is a printing machine that uses cumulative manufacturing technology (that is, rapid prototyping technology) for printing a three-dimensional (3D) object. By inputting 3D data and disposing raw materials into the 3D printer, 3D printers build the 3D object layer by layer according to a preset printing program. Accordingly, conventional 3D printers comprise of a stationary material tank for retaining the raw material. In order to separate a curing layer from the bottom of the material tank after the curing layer is cured on the printing platform, the printing platform must be elevated and then lowered subsequently for exposing and curing a second layer.

One problem with current systems is the speed at which a 3D printer can create 3D objects. The typical up and down movement of a printing platform is repeated for 80% or more of the entire printing process, which eventually results in slow printing speeds and affects printing efficiency. A related problem with current systems is the separation process. Because separating a cured layer must be performed in a manner that avoids damaging the cured layer, current systems tend to address the separation stage of the printing process by slowing the 3D printer, which exacerbates the issue of slow printing speeds. Yet another problem with current systems is that not all materials are suitable for 3D printing, and difficulties are presented with highly viscous materials that although desirable for creating objects with certain applications, are difficult to implement with existing 3D printing technology.

Therefore, there is a need to develop an improved 3D printing method and apparatus to solve the above-mentioned problems, including but not limited to facilitating implementation of high-viscosity photosensitive materials for 3D printing. It is to these ends that the present invention has been developed.

SUMMARY OF THE PRESENT INVENTION

The teachings disclosed herein relate to an apparatus and method for three-dimensional printing, including a three-dimensional printer adapted to utilize a high-viscosity photosensitive material.

Generally, the invention involves a 3D printer configured for, among other things, printing 3D objects using a high-viscosity photosensitive material. Typically, the 3D printer may include a rotating tank assembly which comprises a tank for containing the highly viscous photosensitive material or printing solution therein, and a driving assembly for driving or rotating the tank. The tank may include a bottom plate, which is completely transparent or partially transparent, and a transparent liquid film having a uniform thickness covering the interior bottom plate. A printing platform is situated in a manner such that the platform is raised and lowed above the tank, the printing platform capable of being lowered such that a bottom surface of the printing platform makes contact with the printing solution in the tank. To facilitate printing using the high-viscosity printing material, a scraper assembly may be implemented in order to properly prepare the printing solution onto a surface of the tank. The scraper assembly prepares the high-viscosity photosensitive material by scraping a layer of the material onto the surface of the tank for facilitating curing of the layer onto the printing platform. During the printing process, in some exemplary embodiments, the material tank is rotated at a uniform speed and the printing platform is elevated at a uniform speed, typically without any long pause time or repeated action, to save around 80% of non-curing time, greatly increase the printing efficiency, and speeds up 4 to 10 times of the speed of conventional 3D printers. The use of a high-density transparent liquid film and a centripetal force of the rotating tank ensures the transparent liquid film does not corrugate.

In one example, a three-dimensional printer adapted to utilize a high-viscosity photosensitive material is presented. The three-dimensional printer may include: a printing platform configured to hold solidified layers of a three-dimensional object printed by the three-dimensional printer; a rotating tank assembly configured to contain a photosensitive material; a scraper assembly configured to scrape a layer of the photosensitive material on a transparent surface of the rotating tank assembly; and a control module in communication with the printing platform, the rotating tank assembly, and an exposure mechanism, the control module configured to illuminate the layer of the photosensitive material that is scraped on the transparent surface of the rotating tank assembly in accordance with a geometric profile of the three-dimensional object.

In another example, a three-dimensional printer adapted to utilize a high-viscosity photosensitive material is presented. The three-dimensional printer may include: a printing platform configured to hold solidified layers of a three-dimensional object printed by the three-dimensional printer; a rotating tank assembly configured to contain a photosensitive material; a scraper assembly configured to scrape a layer of the photosensitive material on a transparent surface of the rotating tank assembly, the scraper assembly including a scraper blade arranged over the surface of the tank assembly to scrape the photosensitive material during a rotation of the tank assembly; and a control module in communication with the printing platform, the rotating tank assembly, and an exposure mechanism, the control module configured to illuminate the layer of the photosensitive material that is scraped on the transparent surface of the rotating tank assembly in accordance with a geometric profile of the three-dimensional object.

In yet another example, a three-dimensional printer adapted to utilize a high-viscosity photosensitive material is presented. The may three-dimensional printer include: a printing platform configured to hold solidified layers of a three-dimensional object printed by the three-dimensional printer; a rotating tank assembly configured to contain a photosensitive material; a scraper assembly configured to scrape a layer of the photosensitive material on a transparent surface of the rotating tank assembly; and a control module in communication with the printing platform, the rotating tank assembly, and an exposure mechanism, the control module configured to: illuminate the layer of the photosensitive material scraped on the transparent surface of the rotating tank assembly in accordance with a geometric profile of the three-dimensional object; lower the printing platform to the transparent surface of the rotating tank assembly so that the exposure mechanism cures the layer of the photosensitive material to form a solidified layer onto the printing platform; rotate the rotating tank assembly at a constant speed; tilt at least a portion of the rotating tank assembly so that the solidified layer on the printing platform is separated from the transparent surface of the rotating tank assembly; and subsequent to tilting at least a portion of the tank assembly, elevate the printing platform away from the surface of the rotating tank assembly.

In some exemplary embodiments, a process performed by a 3D printer may include: activating the control module of the 3D printer to control the operations of the exposure mechanism, the printing mechanism, and the rotating tank assembly; rotating the material tank at a constant speed and lowering the printing platform to the bottom of the material tank; and projecting a projected image onto the printing platform through the transparent base plate and a transparent liquid film, so that the printing solution in the projection range is solidified and stuck on the printing platform. As the tank rotates and the printing platform is lifted away from the tank, the solidified or cured layer is peeled away from the transparent liquid film. In some exemplary embodiments, the material tank is driven to rotate at a uniform speed of 0.2 to 5 rpm, and a pause time of the material tank is determined according to a curing time. A high-density transparent liquid film between the bottom of the tank and the printing solution may form a smooth interface that facilitates the separation process. The above steps are repeated to print subsequent layers until the printing process is completed to form the 3D object.

In one example, a method performed by an exemplary 3D printer is provided. The method may include the steps of: disposing or scraping a layer of a photosensitive material on to a transparent surface of a rotating tank assembly of the 3D printer; rotating the tank assembly so that at least a portion of the layer of the photosensitive material scraped on to the transparent surface of the rotating tank assembly is exposed to an exposure mechanism of the 3D printer; and illuminate the layer of the photosensitive material to create a solidified layer cured onto a printing platform of the 3D printer, wherein the solidified layer includes a profile in accordance with a geometric profile of the three-dimensional object being printed.

In some exemplary embodiments, the printing method may further include tilting at least a portion of the rotating tank assembly so that the solidified layer on the printing platform is separated from the transparent surface of the rotating tank assembly. In some exemplary embodiments, the method may further include stopping the rotation of the tank assembly at predetermined stop intervals based on a curing time of the photosensitive material. In some exemplary embodiments, the method may further include elevating the printing platform away from the surface of the rotating tank assembly subsequent to tilting at least a portion of the tank assembly. In some exemplary embodiments, the method may further include pausing movement of the printing platform at a predetermined time before elevating the printing platform at a constant speed.

Various objects and advantages of the present invention will become apparent from the following description taken in conjunction with the accompanying drawings in which are set forth, by way of illustration and example, certain embodiments of this invention.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows:

FIG. 5 is a perspective view of a scraper assembly of a 3D printer according to an exemplary embodiment of the present invention.

FIG. 6 is a side view of the scraper assembly depicted in FIG. 5.

DETAILED DESCRIPTION OF THE INVENTION

Figure 1A:
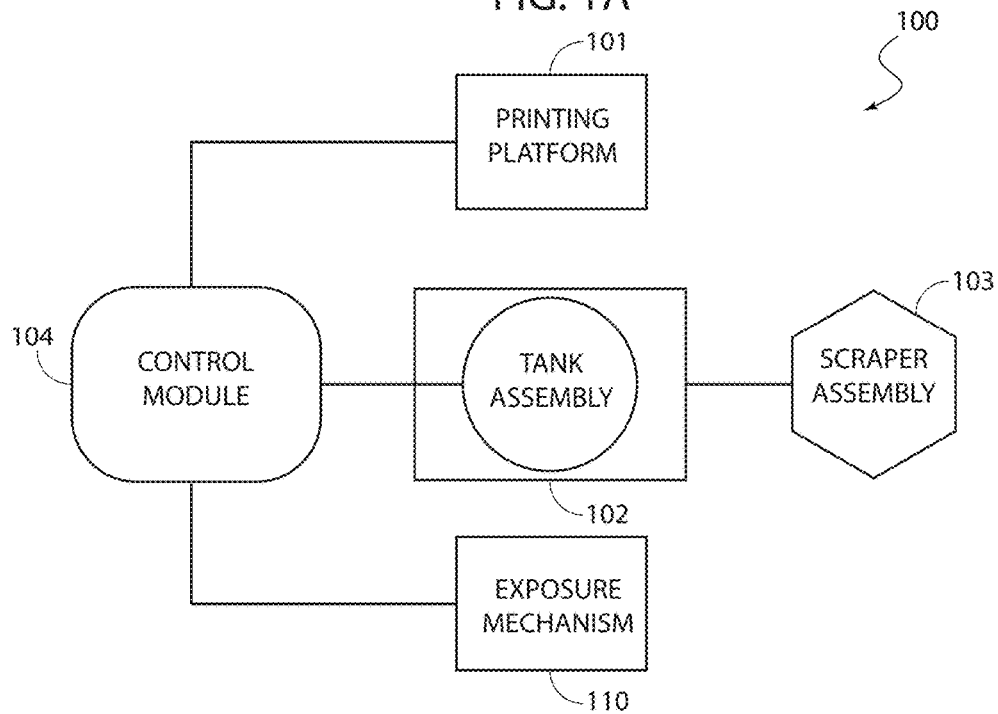
FIG. 1A is a block diagram illustrating exemplary components of a three-dimensional printer in accordance with some embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

For purposes of this disclosure, the terms "upper", "lower", "right", "left", "rear", "front", "vertical", "horizontal" and derivatives thereof shall relate to the invention as oriented in the figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

As used in this disclosure, the term "comprise" and variations of the term, such as "comprising" and "comprises," are not intended to exclude other additives, components, ingredients or steps.

In exemplary embodiments of the present invention, a 3D printer is presented. The 3D printer includes a fluid retaining rotating tank assembly, wherein during the printing process, the material tank can be rotated at a uniform speed to quickly separate from the solidified layer of the printing platform, so as to provide a high printing speed and high printing accuracy. The 3D printer may include a base with an exposure mechanism and a control module, a printing mechanism, a fluid retaining assembly, and a scraper assembly for processing or preparing the printing solution on to a surface of the tank.

The printing mechanism may comprise a module and a printing platform slidably mounted on the module. The fluid retaining assembly or a rotating tank assembly may comprise a material tank for containing a printing solution therein, and a driving assembly for driving the material tank to rotate, wherein the material tank comprises a bottom plate, which is completely transparent or partially transparent, and a transparent liquid film having a uniform thickness covering a surface of the bottom plate.

In some exemplary embodiments, the transparent liquid film is an ionic liquid, wherein a smooth and clean interface is formed between the transparent liquid film and the printing solution. The solidified cured layer on the printing platform can be easily separated from the transparent liquid film as the material tank rotates.

In some exemplary embodiments, the ionic liquid has a density of more than 1.1 g/cm$^3$, a light transmittance of more than 85%, and no volatility. In some exemplary embodiments, the transparent liquid film has a thickness of 2 mm or less.

In some exemplary embodiments, the material tank has a circular shape.

In some exemplary embodiments, the driving assembly comprises a turntable bearing, a bearing holder, and a driving motor. The material tank is securely mounted on the turntable bearing. The bearing holder is securely mounted on the base. The turntable bearing is connected to the driving motor. The drive motor is configured to drive the turntable bearing to rotate freely on the bearing holder so as to rotate the material tank on the base.

In some exemplary embodiments, the scraper assembly comprises a bracket, a scraper blade, and an adjuster. The bracket is stationary affixed on the base, wherein the scraper blade is located in the material tank. The adjuster comprises two guide members provided on the lower surface of the bracket, wherein a longitudinal guiding groove is provided on an inner side of the guide member. Two ends of the scraper blade are coupled at the guiding grooves. The adjuster further comprises a longitudinal connecting rod extended between the guide members, a resilient element, such as a spring, for connecting the scraper blade with the connecting rod, and an adjusting nut provided at a top side of the scraper blade. The adjusting nut is coupled at a screw hole of the bracket. The height of the scraper blade can be adjusted by turning the adjusting nut in order to adjust the distance between the scraper blade and the material tank.

In some exemplary embodiments, the printing platform and the blade may be set at an angle of 70° to 150°; for example, if the tank is a circular tank, the printing platform may be positioned at approximately the 2 o'clock position and the blade of the scraper assembly may be positioned at the 5 o'clock position.

In some exemplary embodiments, the projector is a DLP projector.

In some exemplary embodiments, a process performed by a 3D printer may include: activating the control module of the 3D printer to control the operations of the exposure mechanism, the printing mechanism, and the fluid retaining rotating tank assembly; rotating the material tank at a constant speed and lowering the printing platform to the bottom of the material tank; and projecting a projected image onto the printing platform through the transparent base plate and a transparent liquid film, so that the printing solution in the projection range is solidified and stuck on the printing platform. As the tank rotates and the printing platform is lifted away from the tank, the solidified or cured layer is peeled away from the transparent liquid film. In some exemplary embodiments, the material tank is driven to rotate at a uniform speed of 0.2 to 5 rpm, and a pause time of the material tank is determined according to a curing time. A high-density transparent liquid film between the bottom of the tank and the printing solution may form a smooth interface that facilitates the separation process. The above steps are repeated to print subsequent layers until the printing process is completed to form the 3D object.

Turning now to the figures, FIG. 1A is a block diagram illustrating exemplary components of a three-dimensional printer in accordance with some embodiments of the present invention. More specifically, FIG. 1A shows three-dimensional printer 100, which is adapted to use a highly viscous photosensitive material.

Generally, and in some exemplary embodiments, three-dimensional printer 100 may include: a printing platform 101 configured to hold solidified layers of a three-dimensional object printed by the three-dimensional printer 100; a rotating tank assembly 102 configured to contain a photosensitive material therein; a scraper assembly 103 configured to scrape a layer of the photosensitive material on a transparent surface of the rotating tank assembly 102; and a control module 104 in communication with the printing platform 101, the rotating tank assembly 102, and an exposure mechanism 110. The control module 104 is configured to illuminate the layer of the photosensitive material scraped on the transparent surface of the rotating tank assembly 102 in accordance with a geometric profile of the three-dimensional object being printed by the three-dimensional printer 100.

In another example, three-dimensional printer 100 includes: a printing platform 101 configured to hold solidified layers of a three-dimensional object printed by the three-dimensional printer 100; a rotating tank assembly 102 configured to contain a photosensitive material therein; a scraper assembly 103 configured to scrape a layer of the photosensitive material on a transparent surface of the rotating tank assembly 102, the scraper assembly 103 including a scraper blade (see FIG. 5, FIG. 6, and FIG. 11 below) arranged over the surface of the tank assembly 102 to scrape the photosensitive material during a rotation of the tank assembly 102; and a control module 104 in communication with the printing platform 101, the rotating tank assembly 102, and an exposure mechanism 110. The control module 104 is configured to illuminate the layer of the photosensitive material, which has been scraped on the transparent surface of the rotating tank assembly 102, in accordance with a geometric profile of the three-dimensional object being printed by the three-dimensional printer 100.

In some exemplary embodiments, the control module 104 is configured to:
  (a) illuminate the layer of the photosensitive material scraped on the transparent surface of the rotating tank assembly in accordance with a geometric profile of the three-dimensional object;
  (b) lower the printing platform to the transparent surface of the rotating tank assembly so that the exposure mechanism cures the layer of the photosensitive material to form a solidified layer onto the printing platform;
  (c) rotate the rotating tank assembly at a constant speed; and
  (d) tilt at least a portion of the rotating tank assembly so that the solidified layer on the printing platform is separated from the transparent surface of the rotating tank assembly.

In some exemplary embodiments, the control module 104 is further configured to:
  (e) subsequent to tilting at least a portion of the tank assembly, elevate the printing platform away from the surface of the rotating tank assembly.

In some exemplary embodiments, 3D printer 100 is configured for: disposing or scraping (via scraping assembly 103) a layer of a photosensitive material on to a transparent surface of rotating tank assembly 102 of the 3D printer 100; rotating the tank assembly 102 so that at least a portion of the layer of the photosensitive material scraped on to the transparent surface of the rotating tank assembly 102 is exposed to an exposure mechanism 110 of the 3D printer 100; and illuminate (via the exposure mechanism 110) the layer of the photosensitive material to create a solidified layer cured onto printing platform 101 of the 3D printer, wherein the solidified layer includes a profile in accordance with a geometric profile of a three-dimensional object being printed by 3D printer 100. In some exemplary embodiments, the printing method may further include tilting at least a portion of the rotating tank assembly 102 so that the solidified layer cured on to the printing platform 101 is separated from the transparent surface of the rotating tank assembly 102. In some exemplary embodiments, the method may further include stopping a rotation of the tank assembly 102 at predetermined stop intervals based on a curing time of the photosensitive material. In some exemplary embodiments, the method may further include elevating the printing platform 101 away from the surface of the rotating tank assembly 102 subsequent to tilting at least a portion of the tank assembly 102. In some exemplary embodiments, the method may further include pausing movement of the printing platform 101 at a predetermined time before elevating the printing platform 101 at a constant speed.

Figure 1B:
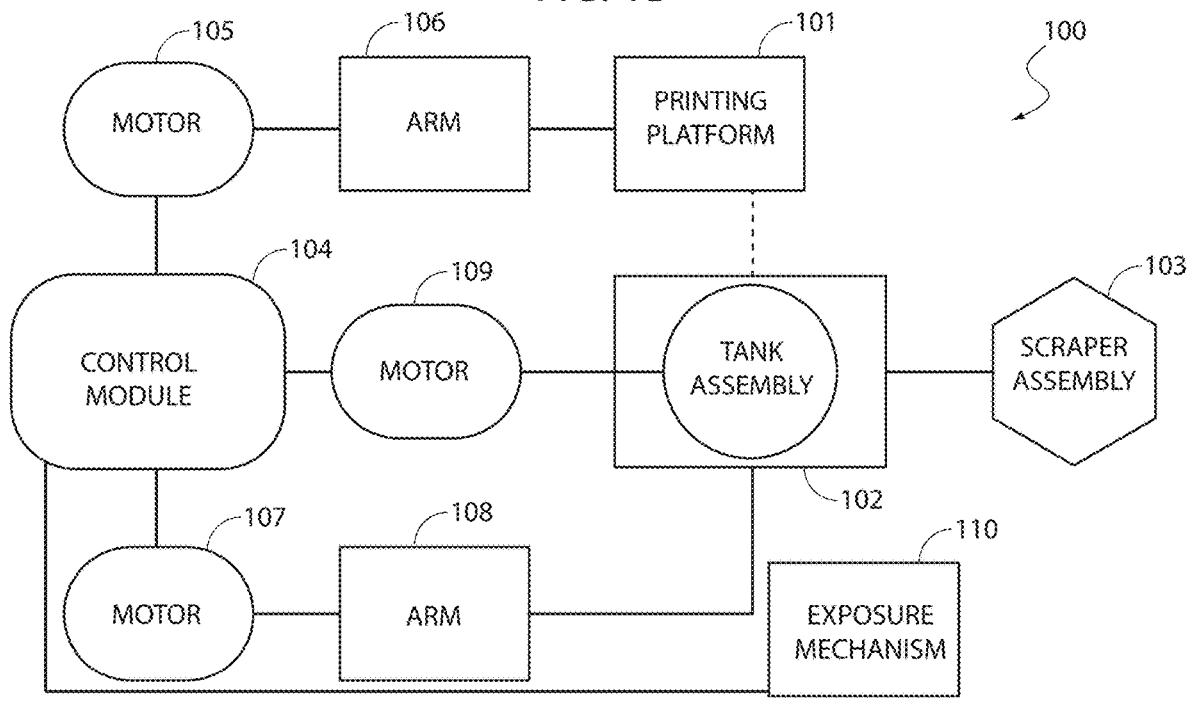
FIG. 1B is a block diagram illustrating exemplary components of a three-dimensional printer in accordance with some embodiments of the present invention.

Turning now to the next figure, FIG. 1B is a block diagram illustrating exemplary components of a three-dimensional printer in accordance with some embodiments of the present invention. More specifically, FIG. 1B shows three-dimensional printer 100, which is adapted to use a high-density or highly viscosity photosensitive liquid. This block diagram shows how printer 100 may employ a plurality of motors and or actuators to facilitate the various functions of a control module controlling a three-dimensional printing process in accordance with the invention.

In some exemplary embodiments, printer 100 may include: a first motor 105 coupled to printing platform 101, for example via a an arm 106 that is configured to move the printing platform vertically; a second motor 109 coupled to tank assembly 102 and configured to rotate the tank assembly 102; a third motor 107 coupled to the tank assembly 102 (for example via a tilting arm 108) and configured to tilt at least a portion of the tank assembly 102; a scraper assembly 103 for disposing a layer of a photosensitive material on a surface of the tank assembly 102; and a control module 104 in communication with the first motor 105, the second motor 109, the third motor 107.

Moreover, control module 104 is typically further in communication with an exposure mechanism 110 for curing a photosensitive material inside the tank assembly, wherein the control module 104 is configured to: actuate the first motor 105 at predetermined intervals to lower the printing platform 101 to a transparent surface of the tank assembly until a solidified layer is formed onto the printing platform 101; actuate the second motor 109 to rotate the tank assembly 102 at a constant speed; and actuate the third motor 107 to tilt at least a portion of the tank assembly 102 so that the solidified layer on the printing platform 101 is separated from the transparent surface of the tank assembly 102. The various components of the block diagrams presented in FIG. 1A and FIG. 1B will be discussed in greater detail below with reference to the remaining figures.

Figure 1C:
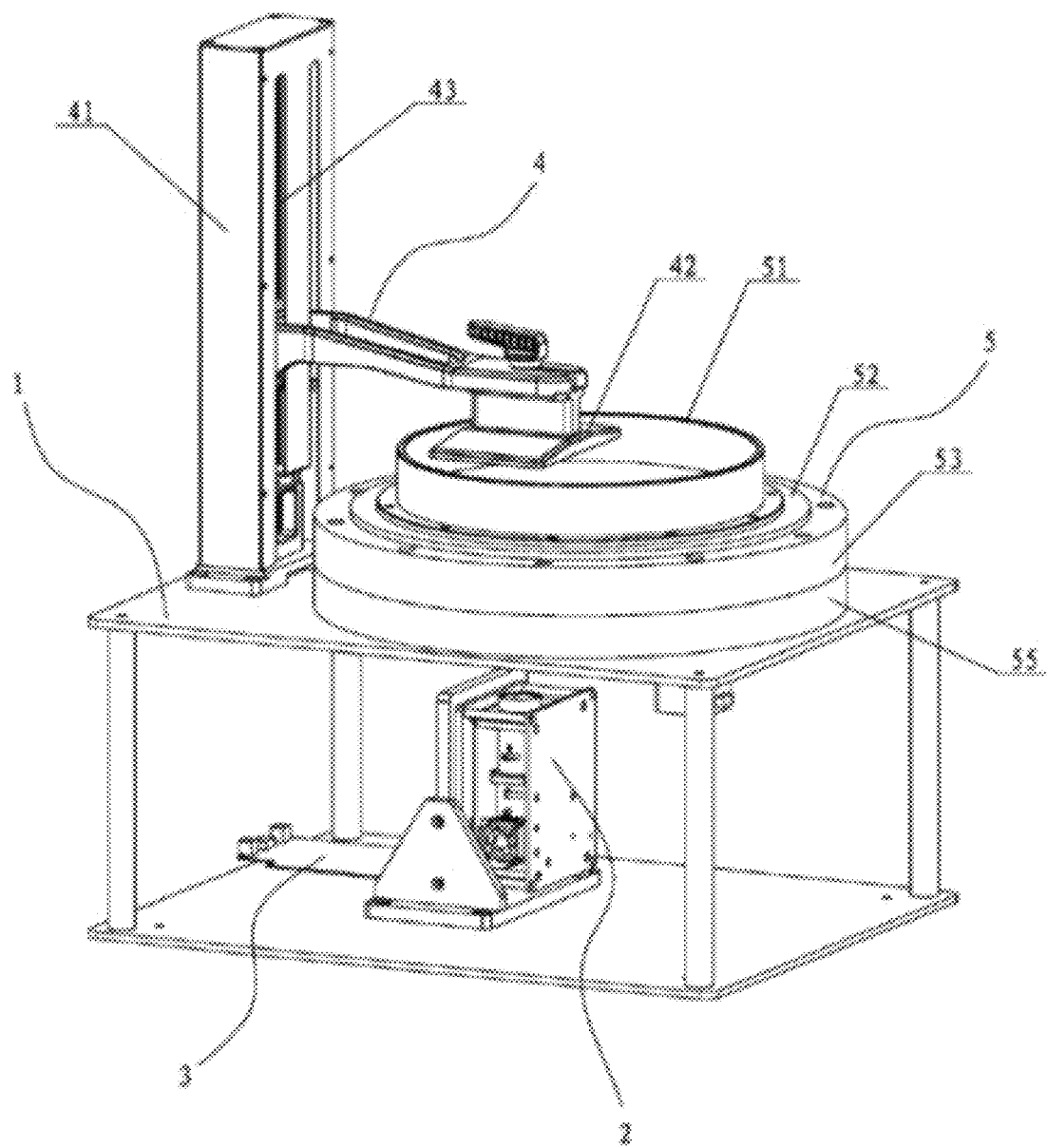
FIG. 1C is a perspective view of a 3D printer according to an exemplary embodiment of the present invention.

Referring to FIG. 1C of the drawings, a 3D printer according to a preferred embodiment of the present invention is illustrated, wherein the 3D printer provides a rapid printing process. The 3D printer comprises a base 1, an exposure mechanism 2 supported by the base 1, a control module 3, a printing mechanism 4, and a fluid retaining rotating tank assembly 5 disposed on the base 1, and a scraper assembly (not shown in this view). The printing mechanism 4 comprises a module 41 and a printing platform 42 slidably mounted on the module 41. In this embodiment, the printing platform 42 is arranged to vertically slide up and down, via a lead screw 43, on the module 41. The printing platform 42 is connected to the lead screw 43, wherein the lead screw 43 is connected to the lead screw motor and is driven by the lead screw motor, such that when the lead screw 43 is rotated to drive the printing platform 42 to move. During the printing process, the printing platform can be elevated at a constant speed. The control module 3 is controlled by a microprocessor. The control module is respectively connected to the exposure mechanism 2, the printing mechanism 3, and the liquid retainer 4 for controlling the actions of mechanisms thereof. In this embodiment, the exposure mechanism 2 is incorporated with a DLP projector, wherein the projector exposure port is located below the material tank 51. Ultraviolet light projected by the DLP projector is used for curing the printing solution. The use of the projector for enhancing the light contrast to shorten the curing time and to increase the printing efficiency.

Figure 2A:
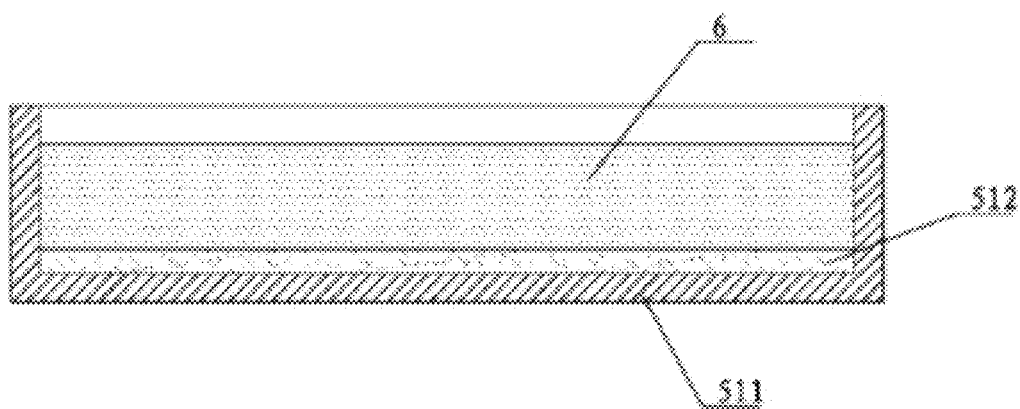
FIG. 2A is a sectional view of a material tank of a 3D printer according to an exemplary embodiment of the present invention.

The rotating tank assembly 5 comprises a circular material tank 51 for holding the printing solution, and a driving assembly for driving the material tank 51 to rotate. As shown in FIG. 2A, the material tank 51 has a completely transparent or partially transparent bottom plate 511 at the bottom of the material tank 51. The bottom plate 511 can be made of glass or other fully transparent materials. The bottom plate 511 may be covered with a transparent liquid film 512 with a uniform thickness. The transparent liquid film 512 may be an ionic liquid. In exemplary embodiments, the ionic liquid may have a density of more than 1.1 g/cm³. In exemplary embodiments, the ionic liquid may have a light transmittance of more than 85%. In exemplary embodiments, the ionic liquid may have no volatility. In exemplary embodiments, the ionic liquid may have a small surface tension and is incompatible with printing solutions such as photosensitive resin liquid. In exemplary embodiments, the thickness of the transparent liquid film 512 is 2 mm or less. In exemplary embodiments, the transparent liquid film 512 has a density greater than water.

In exemplary embodiments, during a low-speed rotation of the material tank 51, a surface flatness is achieved, and no ripples are generated. At the same time, the ionic liquid can also form a smooth interface between the printing solution 6 and the liquid film 512, which facilitates the separation therebetween.

Figure 2B:
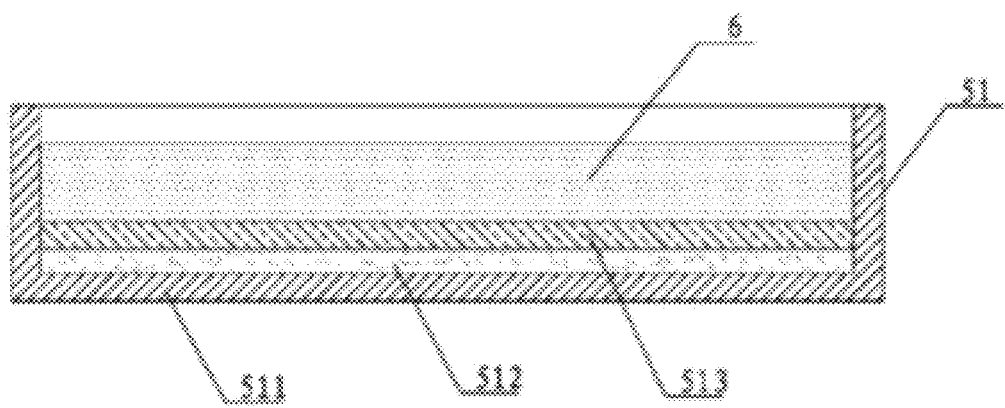
FIG. 2B is a sectional view of a material tank of a 3D printer according to an exemplary embodiment of the present invention.

In FIG. 2B another example is shown. In this embodiment, the bottom plate 511 is covered with a flexible film with a uniform thickness. The flexible film comprises a silicone layer 512 and a "Teflon" film layer 513 sequentially covered on the bottom plate 511 from bottom to top. In this embodiment, the silicone layer 512 is a TOMS film. The flexible film is constructed to have a double-layer transparent material, and it also has good elasticity and film release effect under the condition of ensuring high light transmittance. The thickness of the silicone layer 512 may be between 0.5 mm to 1.5 mm, and the thickness of the Teflon film layer 513 may be between 0.1 mm to 0.2 mm. The projector exposes the printing solution 6 (i.e. the photosensitive solution, typically highly viscous) to light through the bottom plate 511 of the transparent material tank 51 so that a layer of the printing solution 6 may be solidified or cured to the printing platform 42. As will be explained with reference to other figures below, a scraper assembly may scrape a layer of the highly viscous printing solution 6 onto a surface of the bottom plate 511 in order prepare a thin layer for the curing process.

Figure 3:
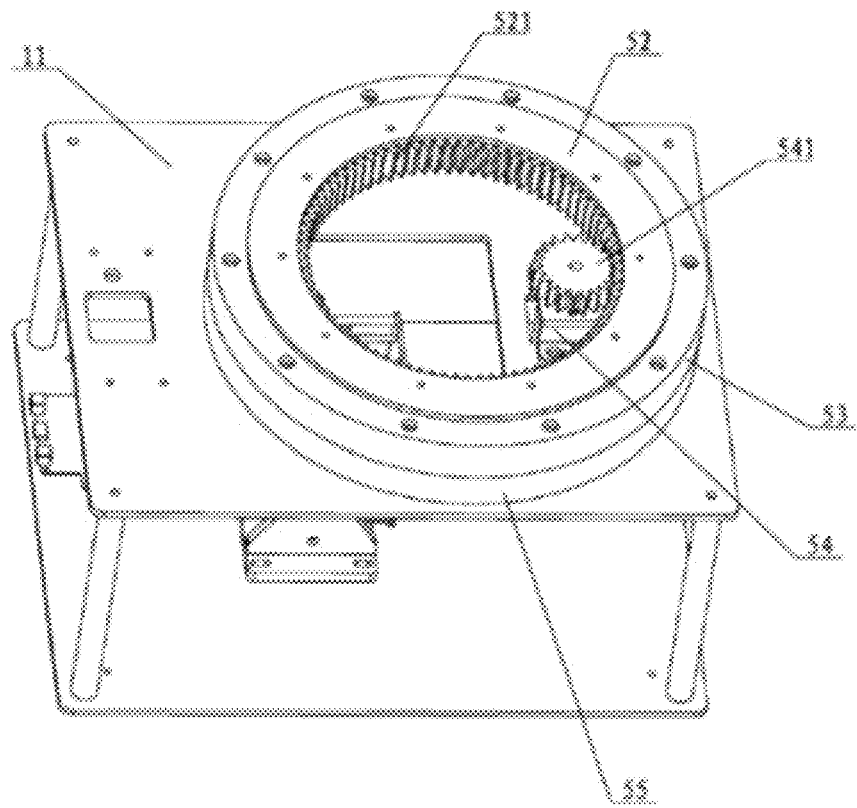
FIG. 3 is a perspective view of a driving assembly and a base of a 3D printer according to an exemplary embodiment of the present invention.
Figure 4:
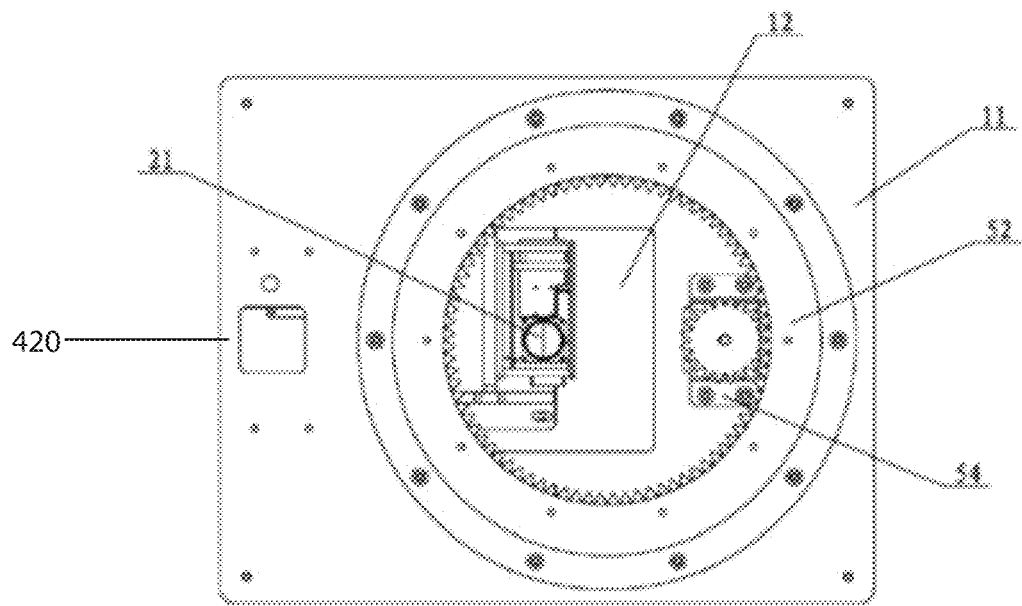
FIG. 4 is a top view of the driving assembly and the base depicted in FIG. 3.

As shown in FIG. 3 and FIG. 4, in some exemplary embodiments, a driving assembly in accordance with the present invention may comprise a turntable bearing 52, a bearing holder 53 and a driving motor 54. The material tank 51 is securely mounted on the turntable bearing 52. The bearing holder 53 is securely mounted on an upper panel 11 of the base 1 through a turntable base 55. In exemplary embodiments, a driving motor 54 may be a gear motor. The rotary bearing 52 comprises a slave gear 521 formed at an inner ring thereof. The gear motor comprises a main gear 541. Through the cooperation of the main gear 541 and the slave gear 521, the turntable bearing 52 can be freely rotated on the bearing holder 53, such that the material tank 51 is rotated on the base 1.

The upper panel 11 has an aperture 12. The exposure mechanism 2 is located below the aperture 12. The exposure mechanism 2 has an exposure opening 21 corresponding to the printing platform 42. The light for exposure and curing is guided to pass through the aperture 12 and the bottom of the material tank 51 to directly project to the printing platform 42 (not shown in this view, but typically mounted in section 420 of panel 11 of base 1.

As shown in FIG. 5 and FIG. 6, the scraper assembly 56 comprises a bracket 561, a scraper blade 562, and an adjuster. The bracket 561 is stationary and affixed on the upper panel 11 of the base 1, wherein the scraper blade 562 is located in the material tank 51. The adjuster comprises two guide members 563 provided on the lower surface of the bracket 561, wherein a longitudinal guiding groove 564 is provided at an inner side of each of the guide members 563. Two ends of the scraper blade 562 are coupled at the guiding grooves 564. The adjuster further comprises a longitudinal connecting rod 565 extended between the guide members 563, a resilient element 567, such as a spring, for connecting the scraper blade 562 with the connecting rod 565, and an adjusting nut 566 provided at a top side of the scraper blade 562. In this embodiment, the adjusting nut 566 is embodied as a micrometer. The adjusting nut 566 has an upper end coupled at a screw hole of the bracket 561 and a bottom end biased against the scraper blade 562. The height of the scraper blade 562 can be adjusted by turning the adjusting nut 566 in order to adjust the distance between the scraper blade 562 and the material tank 51. The printing platform 42 and the scraper blade 562 may be set between 70° and 150°. Generally, an angle is not divisible by 360°, such that the scraper blade 562 will not be returned to its starting position after one full revolution of the material tank 51. In this way, the material tank 51 can be randomly printed 360° in the cured area, and the service life of the transparent soft film of the material tank 51 can be extended. The scraper assembly 56 prepares a layer of the printing material 6 onto a surface of the bottom plate 511 in order prepare a thin layer of the highly viscous photosensitive material for the curing process. Because the printing material is so viscous, simply dispensing the material on the tank, or pouring the material on the tank, would result in too thick of a layer being disposed on the surface of the bottom plate 511, which would not allow the unsuitably thick layer or uneven layer to properly cure when exposed to the light. Accordingly, the scraper assemble utilizes the blade to spread or scrape a proper layer onto the surface of the bottom plate 511 in order prepare a thin layer of the printing material for the curing process. As the tank is rotated, the layer of the printed material that has been scraped onto a section of the surface of the bottom plate 511 will eventually pass over aperture 12, thereby exposing the scraped layer to the light from the exposure mechanism.

In some exemplary embodiments, as will be discussed further below with reference to FIG. 11, the scraper assembly may include a cavity in which the highly viscous photosensitive material or printing solution is stored. As the tank is rotated, a desired amount of the printing solution is spread or scrapped onto a surface of the tank as mentioned above.

In some exemplary embodiments, a printing method performed by an exemplary 3D printer in accordance with the present invention, may include:
  (a) dispensing the printing solution into the material tank 51 and at the same time, switching on the exposure mechanism 2 at a preheated state. This dispensing step comprises scraping the printing solution on to a surface of the tank;
  (b) operating the exposure mechanism 2 and the printing mechanism 4 to start working, wherein the material tank 51 rotates at a uniform speed, and the printing platform 42 is lowered to the bottom of the material tank 51;
  (c) lowering the printing platform 42 to the bottom of the material tank 51 and scrape the printed area flat via the scraper blade 562 during the rotation of the material tank 51; and
  (d) repeating step (b) to print a second layer until the printing process is completed to form the 3D object.

In the course of the steps above, the material tank 51 may be stopped rotating, wherein the projector projects the projected image to the printing platform 42 through the transparent base plate and transparent soft film, so that the printing solution in the projection range is solidified and pasted on the printing platform 42. A distance between the scraper blade and the bottom of the material tank may have been previously manually adjusted. The thickness of a single layer may be defined as the distance between the lower surface of the printing platform 42 and the upper surface of the transparent liquid film 512 of the material tank. During the curing process, the printing platform 42 may be elevated at a uniform speed. The material tank 51 may be driven to rotate at a constant speed. The material tank may be rotated at a constant speed at 0.2 to 5 rpm. The elevating speed of the printing platform may be uniform and may be about 0.02-0.5 mm/sec. During the printing process, the material tank 51 may be rotated at a uniform speed, and the printing platform elevated at a uniform speed so that there is no long pause time or repeating action during the printing process to save about 80% of the non-curing time, so as to greatly increase the printing efficiency and speed up to 4 to 10 times of the speed of conventional 3D printing methods.

Accordingly, the pause time of the printing platform 42 and the material tank 51 is generally determined according to the cross-section of the printed object (that is, the area of the solidified layer) and the curing time of the printing solution (the pause time of the printing platform may be about 0.1-10 second and the pause time of the material tank 51 may be about 0.2-1 second). When the area of the solidified layer is small and the solidification time of the printing solution is quick, the printing platform 42 and the material tank 51 can be printed at a uniform speed without stopping the printing process. However, when the area of the curing layer is large and the solidification time of printing solution is slow, a pause time is required to facilitate the printing solution returning below the printing platform 42 and allowing the curing time for the exposure mechanism 2.

During the printing process, in some exemplary embodiments, the material tank is rotated at a uniform speed and the printing platform is elevated at a uniform speed, typically without any long pause time or repeated action, to save around 80% of non-curing time, greatly increase the printing efficiency, and speeds up 4 to 10 times of the speed of conventional 3D printers. The use of a high-density transparent liquid film 512 and a centripetal force of the rotating tank ensures the transparent liquid film does not corrugate.

The projector projects an image to the printing platform through the transparent base plate 511 and the transparent liquid film 512, so that the printing solution in the projection range is cured and pasted on the printing platform 42, and at the same time, the high-density transparent liquid film can also form a smooth interface between the printing solution and the liquid film for facilitating the separation therebetween.

The 3D printer of the present invention can be used for a printing solution with a relatively high viscosity, such as a ceramic paste, and can print a ceramic 3D object. During the printing process, the material tank 51 is rotated at a constant speed, and the scraper blade 562 is guided to uniformly scrape the printing solution during the rotation of the material tank 51 to ensure the flatness of the cured layer. The curing thickness of each curing layer is consistently uniform.

Figure 7:
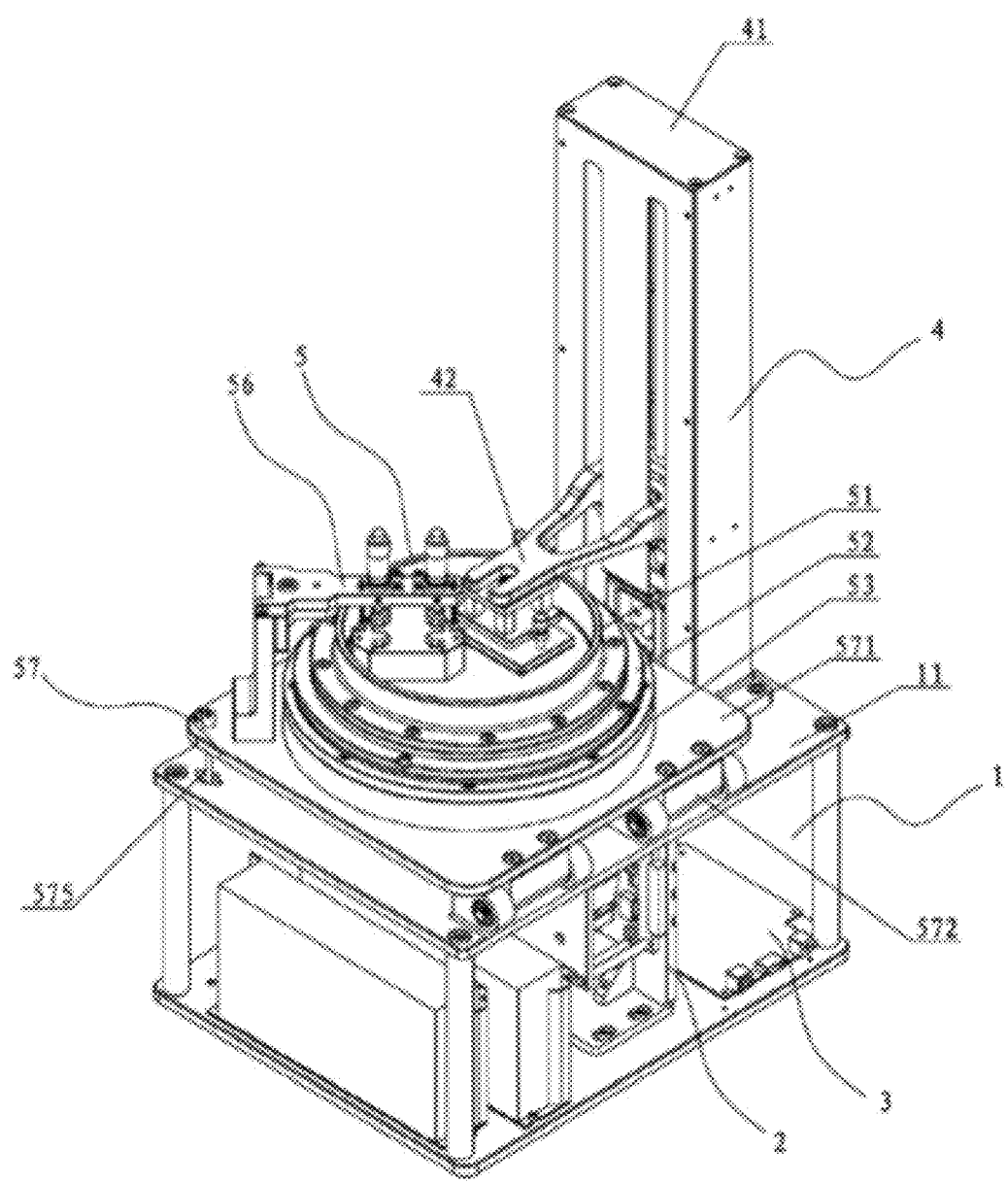
FIG. 7 is a perspective view of a 3D printer according to an exemplary embodiment of the present invention.
Figure 8:
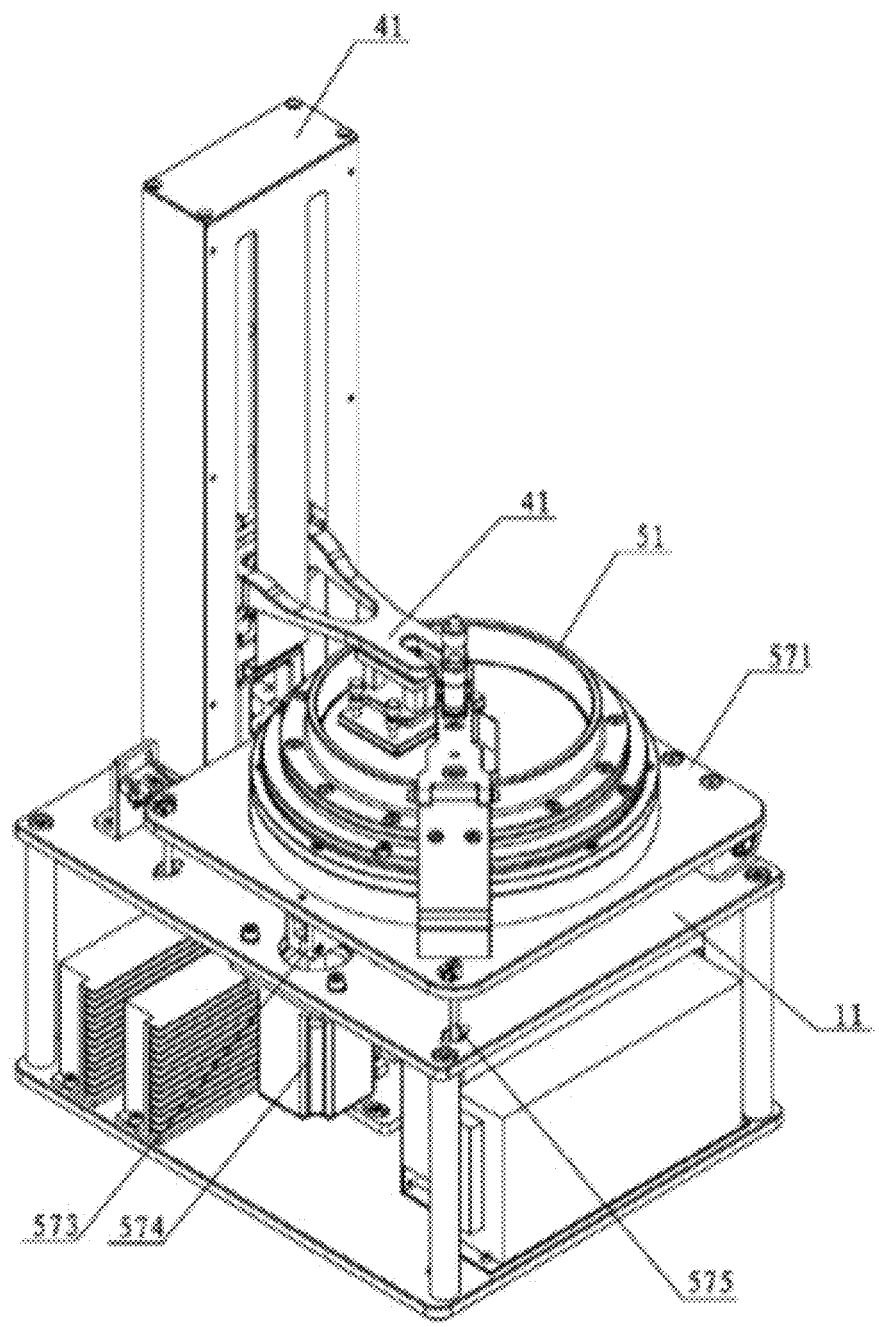
FIG. 8 is another perspective view of the 3D printer depicted in FIG. 7.
Figure 9:
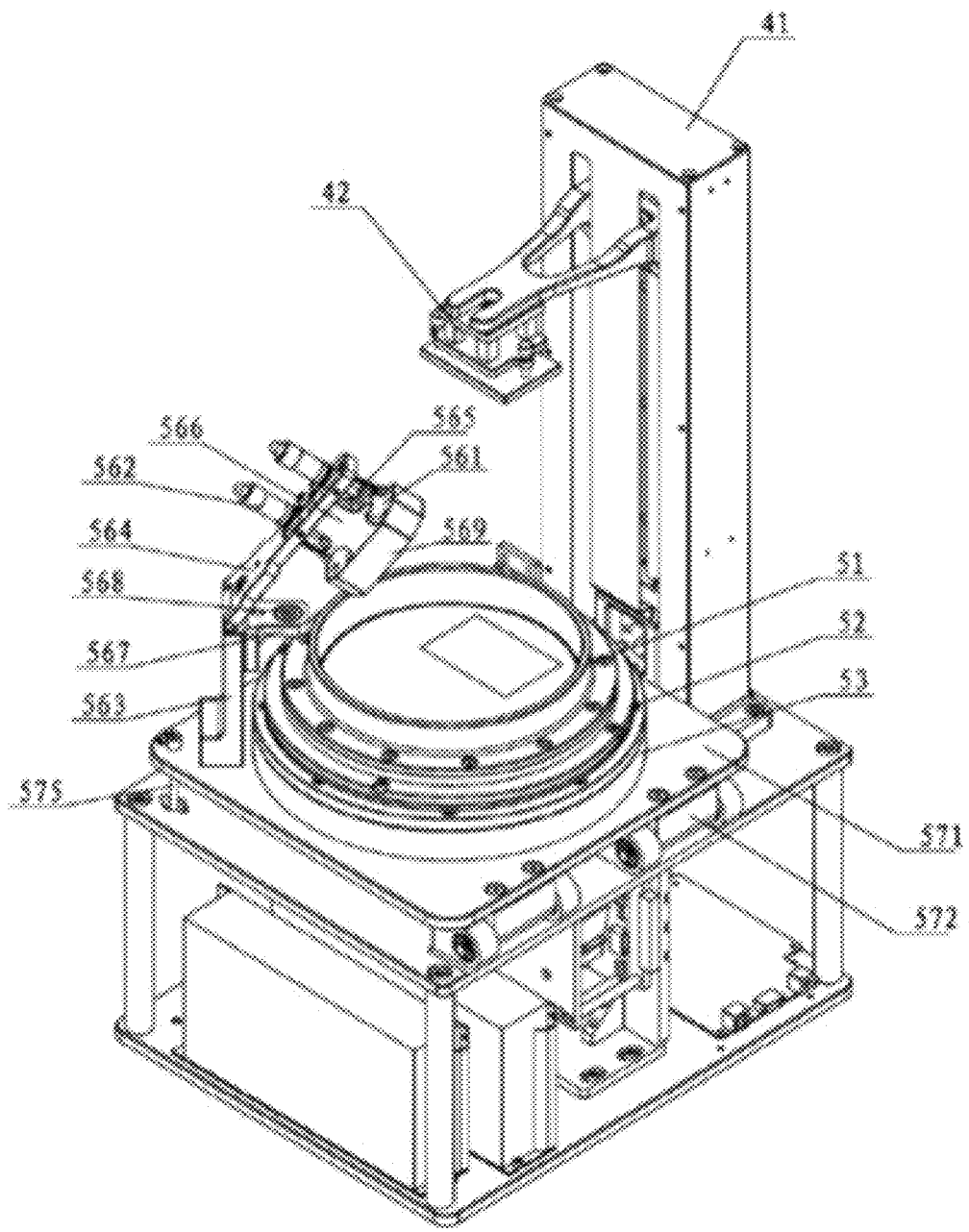
FIG. 9 is a perspective view of the 3D printer depicted in FIG. 7, showing the printing platform being lifted up, and the scraper blade assembly being set in a non-working position.

Turning now to the next set of figures, FIG. 7 is a perspective view of a 3D printer according to an exemplary embodiment of the present invention; FIG. 8 is another perspective view of the 3D printer depicted in FIG. 7; and FIG. 9 is a perspective view thereof, showing a scraper blade assembly set in a non-working position.

From these views, it can be appreciated that a rotating tank assembly 5 comprises a circular material tank 51 for holding the printing solution, a driving assembly for driving the material tank 51 to rotate, and includes or is coupled to a tilted pulling assembly 57 for pulling and pushing the material tank 51. A scraper assembly 56 for processing or scraping a layer of the printing solution is secured to base panel 571 that supports rotating tank assembly 5. The material tank 51 has a completely transparent or partially transparent bottom plate such as transparent or partially transparent bottom plate 511 at the bottom of the material tank 51.

In some embodiments, bottom plate 511 can be made of glass or other fully transparent materials. The bottom plate 511 may be covered with a flexible film with a uniform thickness. The flexible film may comprise a "Teflon" film layer covered on the bottom plate 511. In some embodiments, a film may be disposed between the flexible film and the transparent bottom of the material tank 51. The film may be configured for preventing air bubbles formed between the bottom plate 511 and the "Teflon" film. Teflon film and film are both transparent materials, wherein they also have good elasticity and easy peeling effect under the condition of high light transmittance. The thickness of the Teflon film may be about 0.1-0.2 mm, and the thickness of the film may be about 0.1-0.2 mm. The light for exposure and solidification by the projector is guided to pass through the bottom of the transparent material tank 51 directly to the printing platform 42. In addition, a silicone layer can also be provided between the flexible film and the transparent bottom of the material tank 51. The silicone layer can ensure that the flexible film and the transparent bottom of the material tank have good adhesion without generating air bubbles.

Figure 10:
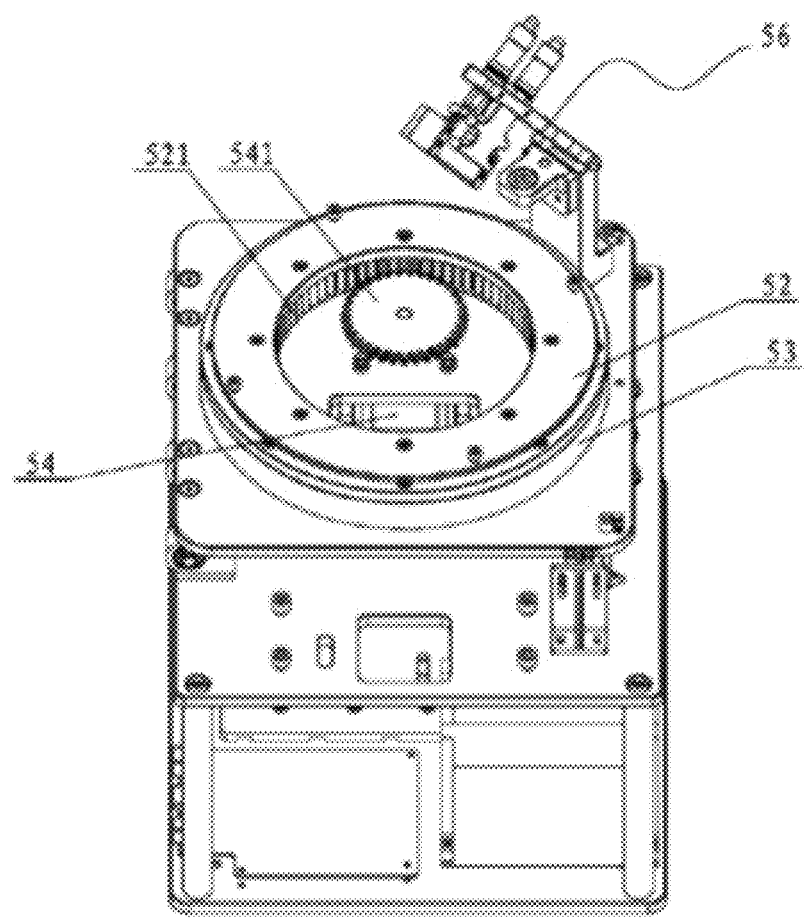
FIG. 10 is a perspective view of a driving assembly of a 3D printer according to an exemplary embodiment of the present invention.

Turning now to the next figure, FIG. 10 is a perspective view of a driving assembly of a 3D printer according to an exemplary embodiment of the present invention. More specifically, FIG. 10 depicts driving assembly comprising a turntable bearing 52, a bearing holder 53 and a driving motor 54. The material tank 51 is securely mounted on the turntable bearing 52. The bearing holder 53 is securely mounted on an upper panel 11 of the base 1 through a turntable base 55. The driving motor 54 is embodied as a gear motor. The rotary bearing 52 comprises a slave gear 521 formed at an inner ring thereof. The gear motor comprises a main gear 541. Through the cooperation of the main gear 541 and the slave gear 521, the turntable bearing 52 can be freely rotated on the bearing holder 53, such that the material tank 51 is rotated on the base 1.

The tilted pulling assembly 57 comprises a mounting base panel 571 mounted on the upper panel 11 via a connector 572, wherein the bearing holder 53 is securely fixed on the mounting base panel 571. The tilted pulling assembly 57 further comprises a pull rod member 573 provided on the mounting base panel 571 at an opposite side of the connector 572, and a titled pull motor 574 connected to the pull rod member 573, wherein the mounting base panel 571 can be rotated along the connector 572 by raising or lowering the pull rod member 573. The connector 572 can be a pivot joint or a hinge. In order to prevent the mounting base panel 571 from over-returning to its initial position, two sides of the pull rod member 573 are further provided with limit rod members 575.

Figure 11:
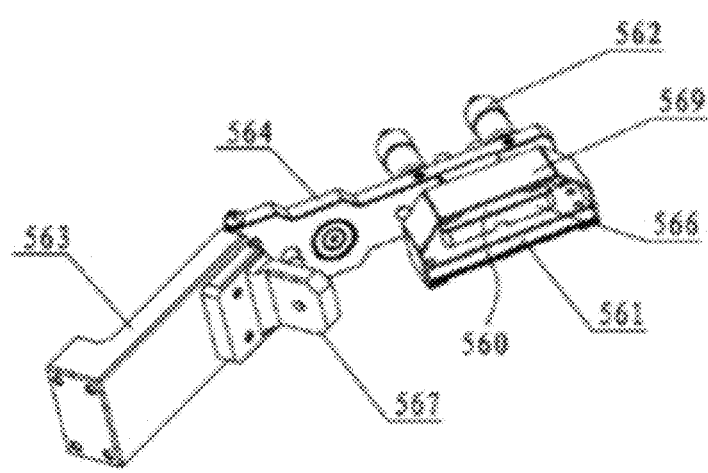
FIG. 11 is a perspective view of a scraper assembly of a 3D printer according to an exemplary embodiment of the present invention.

As shown in FIG. 11, the scraper assembly 56 comprises a scraper blade 561, and an adjuster 562 (two micrometers installed in parallel in this embodiment), and a bracket. Accordingly, the bracket, which is configured to have a movable structure, comprises a lower bracket 563 that is stationary and mounted on the mounting base panel 571, and an upper bracket 564 that is movably mounted on the upper end of the lower bracket 563. The upper bracket 564 is set horizontally, wherein the scraper blade 561 and the adjuster 562 are mounted on the upper bracket 564. The upper bracket 564 can be rotated freely along the top of the lower bracket 563 for facilitating the installation and adjustment of the scraper blade 561 and the adjuster 562. The scraper assembly 56 further comprises a horizontal supporting panel 567 provided on the top of the lower bracket 563, wherein the supporting panel 567 and the upper bracket 564 are magnetically attracted with each other by a magnet 568 to ensure the stability of the upper bracket 564.

The scraper blade 561 is mounted to the upper bracket 564 through an elastic member and is located in the material tank 51. The adjuster 562 is mounted on the upper bracket 564 and is located above the scraper blade 561. The adjuster 562 is arranged to selectively adjust a distance between the bottom of the scraper blade 561 and the bottom of the material tank 51. In some exemplary embodiments, in order to achieve a stable installation of the scraper blade 561, two sides of the top of the scraper blade 561 are connected to the upper bracket 564 through a spring 565. The scraper assembly 56 further comprises two guiding members 566 provided at front and rear surfaces of the scraper blade 561 respectively, wherein the guiding members 566 are stationary mounted on the upper bracket 564. Each of the guiding members 566 has a guiding groove. The scraper blade 561 has two guiding protrusions (such as guiding pins, guiding ribs, etc) formed at the front and rear surfaces thereof corresponding to the guiding grooves of the guiding members 566 respectively. The printing platform 42 and the scraper blade 561 may be set between 70° and 150°. Generally, an angle is not divisible by 360°, such that the scraper blade 561 will not be returned back to its starting position after one full revolution of the material tank 51. In this way, the material tank 51 can be randomly printed 360° in the cured area, and the service life of the transparent soft film of the material tank 51 can be extended.

The scraper assembly 56 further comprises a blocking member 569 mounted on the front or rear surface of the scraper blade 561, wherein the blocking member 569 is arranged to enclose the scraper blade 561 to form a receiving cavity 560. The bottom edge of the blocking member 569 is generally lower than or equal to the bottom side, wherein the receiving cavity 560 is arranged to store the printing solution. As such, in some exemplary embodiments, the scraper assembly includes cavity 560 in which the highly viscous photosensitive material or printing solution is stored; as the tank is rotated, a desired amount of the printing solution is spread or scrapped onto a surface of the tank as mentioned above.

A method in accordance with the present invention, may comprise the following steps:

(a) Activating the control module 3 to actuate and control the exposure mechanism 2, the printing mechanism 4, and the liquid holding mechanism to start working. The distance between the scraper blade 561 and the upper surface of the transparent flexible film at the bottom of the material tank 51 is adjusted by the adjuster 562. The material tank 51 is actuated to rotate at a uniform speed. The scraper blade 561 is actuated to scrape the printing solution in the material tank 51 into a flat printing layer. The thickness of the printing layer is one single solidified layer or slightly larger than the thickness of one single solidified layer (considering that the printing solution is likely to become thin due to the printing platform 42 falling and squeezing when the printing solution is not cured). The material tank 51 is stopped rotating.

(b) Lowering the printing platform 42 to the bottom of the material tank 51. At this time, the distance between the lower surface of the printing platform 42 and the upper surface of the transparent soft film of the material tank 51 is the thickness of a single layer printing. The projector is actuated to generate light to pass through the transparent base plate and the transparent soft film, wherein the projection image is projected onto the printing platform 42, such that the printing solution within the projection range is solidified and stuck on the printing platform 42.

(c) After the curing or solidifying is completed, the tilted pulling assembly 57 is activated to start operating, and the titled pull motor 574 is actuated to pull the mounting base panel 571 to tilt at one side, so that the solidified layer of the printing platform 42 is separated from the bottom of the material tank 51. After separation, the printing platform 42 is lifted up, and the titled pull motor 574 is actuated to push the rod upward to restore the material tank 51 to its initial position. The material tank 51 is set to continuously rotate. The material tank 51 is actuated to rotate at a uniform speed at 0.5-5 rmp. The scraper blade 561 is arranged to scrape the printed area flat during the rotation of the material tank 51. After scraping and smoothing the printed area, the material tank 51 is stopped rotating, wherein the pause time of the material tank 51 is set depending the curing time, such as 0.5-10 seconds.

(d) Lowering the printing platform 42 to the bottom of the material tank 51 again, and repeating steps (b) and (c) for the second layer of printing until the printing is completed.

Figure 12A:
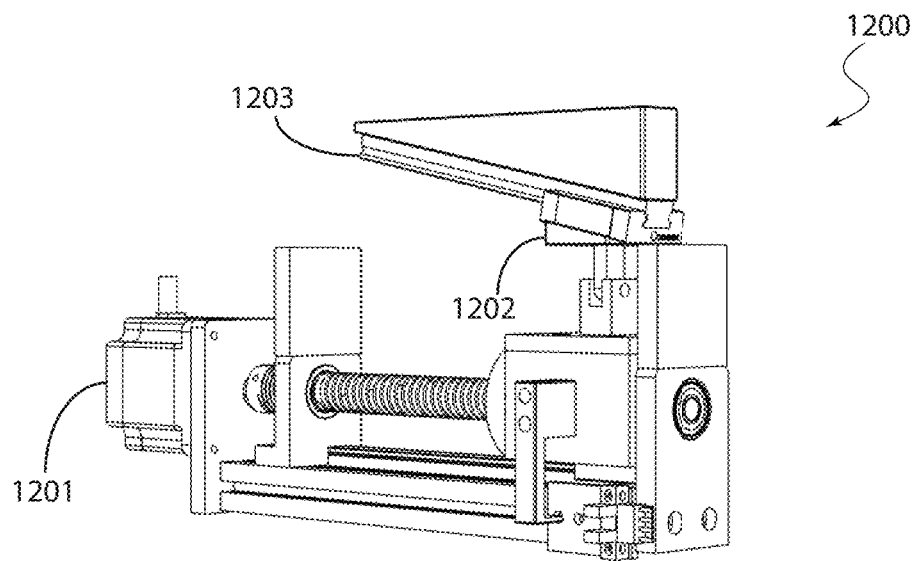
FIG. 12A is perspective view of an exemplary tilting mechanism for a three-dimensional printer in accordance with some embodiments of the present invention.
Figure 12B:
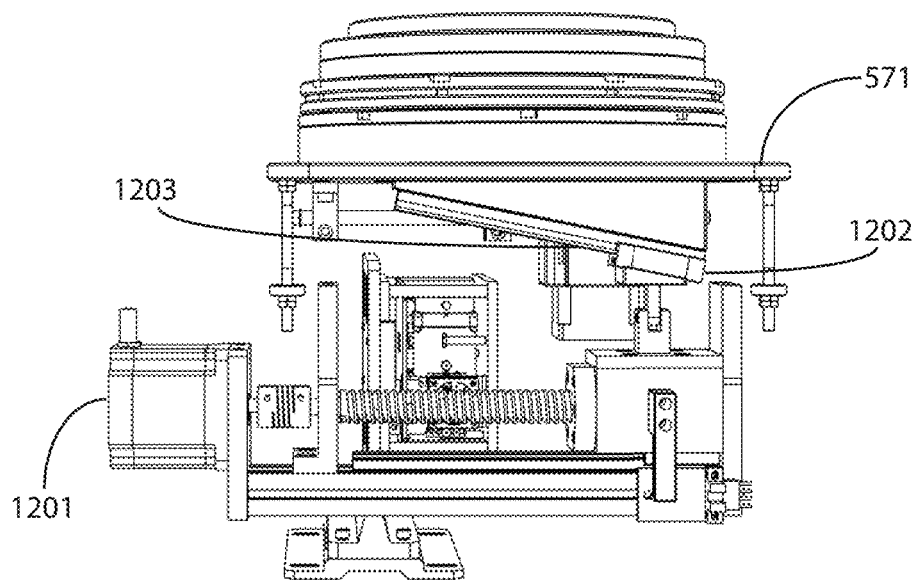
FIG. 12B is side view of an exemplary 3D printer in accordance with some embodiments of the present invention, depicting a tilting mechanism coupled beneath a rotating tank assembly of the three-dimensional printer.

FIG. 12A is perspective view of an exemplary tilting mechanism for a three-dimensional printer in accordance with some embodiments of the present invention. More specifically, tilting mechanism 1200 is shown, including a motor or actuator 1201 that causes an actuator arm 1202 to slide across a track 1203 that is coupled to platform 571 of the rotating track assembly of the printer. Accordingly, actuating tilt mechanism 1200 will cause the platform 571 and thus the rotating tank assembly in a manner to facilitate separation of a printed solidified layer and a surface of the tank. FIG. 12B is side view of an exemplary three-dimensional printer in accordance with some embodiments of the present invention, depicting a tilting mechanism coupled beneath a rotating tank assembly of the three-dimensional printer. From this view, it may be more readily appreciated how actuation of the tilt mechanism 1200 will cause the platform 571 to move or tilt the tank.

A method performed by a 3D printer in accordance with the present invention, may comprise the steps of: scraping (via scraping assembly 56) a layer of a photosensitive material on to a transparent surface of rotating tank assembly 5 of the 3D printer; rotating the tank assembly 5 so that at least a portion of the layer of the photosensitive material scraped on to the transparent surface of the rotating tank assembly 5 is exposed to an exposure mechanism 2 of the 3D printer; and illuminate (via the exposure mechanism 2) the layer of the photosensitive material to create a solidified layer cured onto printing platform 42 of the 3D printer, wherein the solidified layer includes a profile in accordance with a geometric profile of a three-dimensional object being printed by 3D printer.

In some exemplary embodiments, the printing method may further include tilting at least a portion of the rotating tank assembly 5 so that the solidified layer cured on to the printing platform 42 is separated from the transparent surface of the rotating tank assembly 5. In some exemplary embodiments, the method may further include stopping a rotation of the tank assembly 5 at predetermined stop intervals based on a curing time of the photosensitive material. In some exemplary embodiments, the method may further include elevating the printing platform 42 away from the surface of the rotating tank assembly 5 subsequent to tilting at least a portion of the tank assembly 5. In some exemplary embodiments, the method may further include pausing movement of the printing platform 42 at a predetermined time before elevating the printing platform 42 at a constant speed.

The above description is only the preferred embodiment of the present invention and is not intended to be limiting. The present invention should include all modifications, equivalent substitutions and improvements made within the spirit and principles of the present invention.

While the embodiments and alternatives of the invention have been shown and described, it will be apparent to a person skilled in the art that various other changes and modifications can be made without departing from the spirit and scope of the invention.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into other stereolithography or three-dimensional printing systems. That is, at least a part of the devices and/or processes described herein may be integrated into a stereolithography or three-dimensional printing system via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

An apparatus for three-dimensional printing has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method performed by a three-dimensional (3D) printer, the 3D printer including a tank adapted to be at least partially filled with a photosensitive liquid and including a bottom surface to hold the photosensitive liquid within the tank, the method comprising:
   depositing a layer of photosensitive material on to the bottom surface of the tank;
   illuminating the layer of photosensitive material to create a solidified layer cured onto a printing platform;
   tilting the tank so that at least a portion of the solidified layer on the printing platform is separated from the bottom surface of the tank;
   determining a curing time of the layer of photosensitive material;
   based at least in part on the curing time, determining an amount of time to wait prior to moving the printing platform;
   waiting the determined amount of time; and
   moving the printing platform away from the bottom surface of the tank.

2. The method of claim 1 further comprising:
   returning the tank to a pre-tilted orientation.

3. The method of claim 1 wherein the determined amount of time is 0.1-10 seconds.

4. The method of claim 1 wherein the moving the printing platform away from the bottom surface of the tank includes moving the printing platform at a uniform speed.

5. The method of claim 1 wherein moving the printing platform away from the bottom surface of the tank includes moving the printing platform at a speed of about 0.02 to 0.5 mm/sec.

6. The method of claim 1 further comprising:
   rotating the tank.

7. The method of claim 6 further comprising:
   stopping the rotating of the tank at predetermined stop intervals based at least in part on a curing time of the photosensitive material.

8. The method of claim 6 wherein the photosensitive material includes ceramic paste.

9. The method of claim 6 wherein the rotating the tank includes rotating the tank at a uniform speed.

10. The method of claim 6 wherein the rotating the tank includes rotating the tank at a speed of about 0.2 to 5 rpm.

11. The method of claim 6 wherein the rotating the tank is at least partially performed by a controller.

12. The method of claim 1 wherein the depositing the layer of photosensitive material on to the bottom surface of the tank includes scraping the layer of photosensitive material on to the bottom surface of the tank.

13. The method of claim 12 further comprising:
   adjusting a distance between a scraper blade and the bottom surface of the tank.

14. The method of claim 1 wherein the depositing the layer of photosensitive material on to the bottom surface of the tank further comprises:
   storing a quantity of the photosensitive material within a cavity of a scraper; and
   dispensing the stored photosensitive material from the cavity onto the bottom surface of the tank.

15. The method of claim 1 wherein at least a portion of depositing the layer of photosensitive material on to the bottom surface of the tank, illuminating the layer of photosensitive material to create the solidified layer cured onto the printing platform, and/or tilting the tank so that the at least a portion of the solidified layer on the printing platform is separated from the transparent bottom surface of the tank is performed using a controller.

16. The method of claim 1 wherein the moving the printing platform away from the bottom surface of the tank is at least partially performed by a controller.

17. The method of claim 1 wherein the tilting at least a portion of the tank includes moving a pull rod and/or sliding an arm across a track.

18. The method of claim 17 wherein the pull rod and/or the track is configured with the tank.

19. The method of claim 17 wherein the moving of the pull rod and/or the sliding of the arm across the track is performed by a motor.

20. A method performed by a three-dimensional (3D) printer, the 3D printer including a tank adapted to be at least partially filled with a photosensitive liquid and including a bottom surface to hold the photosensitive liquid within the tank, the method comprising:
   depositing a layer of photosensitive material on to the bottom surface of the tank;
   illuminating the layer of photosensitive material to create a solidified layer cured onto a printing platform; and
   moving an arm along a track to tilt the tank so that at least a portion of the solidified layer on the printing platform is separated from the bottom surface of the tank.

21. The method of claim 20 wherein the track is configured with the tank.

22. The method of claim 21 wherein the arm is caused to move along the track in a first direction causing the tank to tilt in a second direction.

23. The method of claim 22 wherein the second direction is substantially orthogonal to the first direction.

24. The method of claim 20 wherein the moving of the arm is caused by a motor.

\* \* \* \* \*